Oct. 20, 1959          M. DI GIOVANNI          2,909,744
                    ELECTRICAL ACCELEROMETER
Filed Oct. 22, 1956                           2 Sheets-Sheet 1
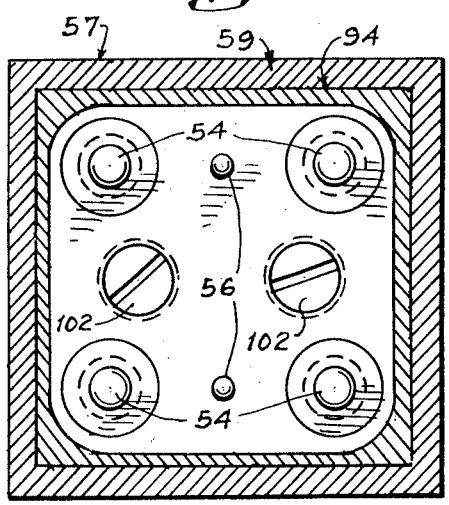
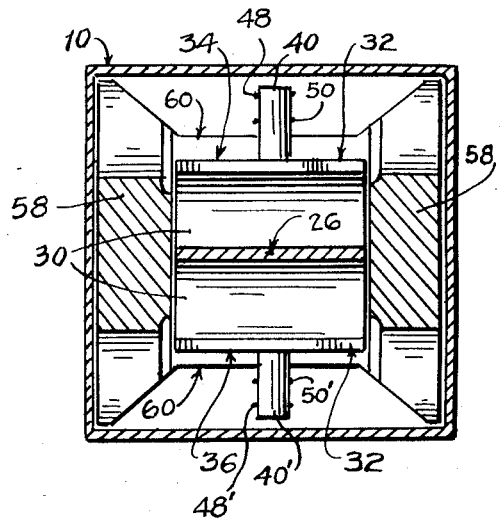
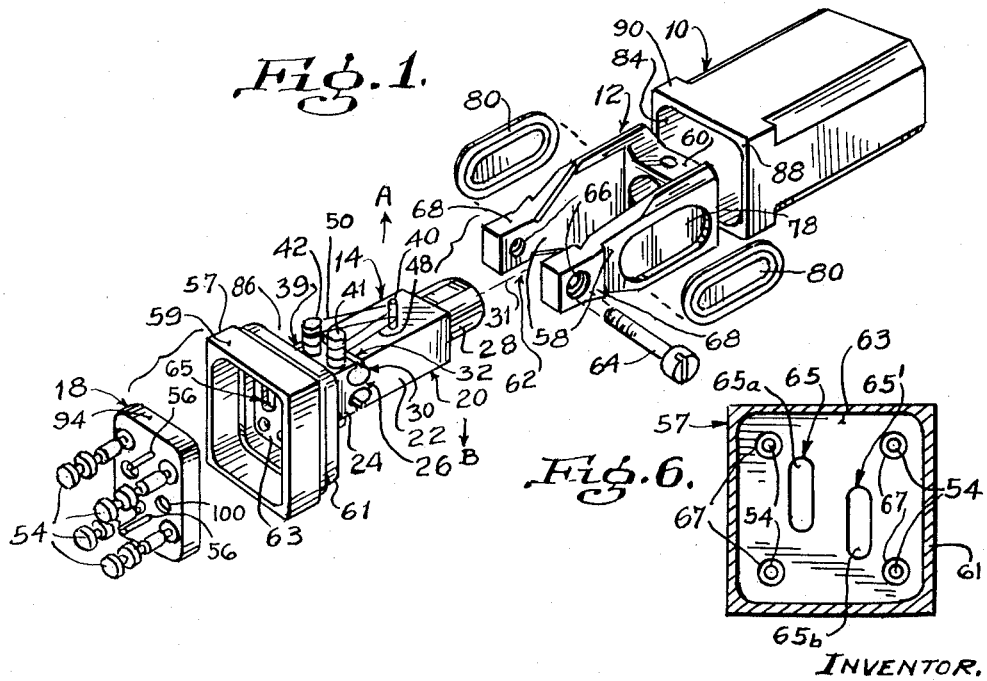
INVENTOR.
MARIO DI GIOVANNI
BY Philip Suthrow
       ATTORNEY.

Oct. 20, 1959                M. DI GIOVANNI                 2,909,744
                          ELECTRICAL ACCELEROMETER
Filed Oct. 22, 1956                                       2 Sheets-Sheet 2

INVENTOR.
MARIO DI GIOVANNI
BY Philip Sutter
ATTORNEY.

United States Patent Office 2,909,744
Patented Oct. 20, 1959

2,909,744

ELECTRICAL ACCELEROMETER

Mario Di Giovanni, Pacific Palisades, Calif., assignor to Statham Instruments, Inc., Los Angeles, Calif., a corporation of California Application October 22, 1956, Serial No. 617,396

7 Claims. (Cl. 338—6)

The invention is particularly directed to an accelerometer, and incorporating a wire resistance strain gauge of the so-called unbonded type.

Unbonded strain gauges are generally composed essentially of a strain sensitive wire connected to two supports which are subject to separation under an applied force. When subjected to tension the wire changes in dimensions, and therefore changes in resistance. Means are provided for measuring the resulting change in resistance which is then translatable into a measurement of the applied force. Such gauges have found wide application in industry. A device of this type employed in an accelerometer is illustrated in Statham Patent No. 2,453,548.

In the prior art forms of accelerometers employing such unbonded strain gauges as exemplified by the above patent, the effective inertial or seismic mass is suspended on springs or cantilevers, and the nature and magnitude of the displacement of the mass on the springs are a measure of the magnitude and nature of the motion or acceleration. Generally, in these accelerometers, the seismic mass is connected to the springs or cantilevers by means of screws or other fasteners, and said springs or cantilevers are also in turn connected to the instrument frame by means of similar fasteners. Wire mountings are mounted on the movable members, e.g., the mass or the cantilevers, and also on the stationary frame, and strain wires are looped in tension between said movable and stationary wire mountings.

While these types of motion sensing devices or accelerometers find wide usage, in certain applications very small accelerometers of very insignificant total mass are required. Since prior art accelerometers of the aforementioned construction with their multiple components, including the springs with their hinges and fasteners between the frame and the seismic mass, are generally of too complex a structure to meet the rigorous requirements of miniaturization often dictated in many instances, the problem of completely redesigning these conventional accelerometers particularly to meet these miniaturization standards has presented itself.

Accordingly, one object of this invention is to design a motion sensing device particularly in the form of an accelerometer of very small size and low mass, and having a minimum of component parts, yet which has an accuracy, sensitivity and reliability comparable to or greater than conventional accelerometers.

A further object is the provision of a sub-miniature, particularly linear, accelerometer having the foregoing characteristics, and incorporating an unbonded strain wire transducer as the motion sensing device.

Other objects and advantages will appear from the following description of my invention:

I have devised a motion sensing device, particularly in the form of an accelerometer, wherein the flexure member, the force summing member (i.e., the seismic mass), and the stationary frame portion, on which the strain wires are mounted, are all integrally formed as a single member, thus eliminating the need for hinges, screws and other fasteners heretofore employed in the prior art motion sensing devices and accelerometers, for connecting the flexure member or springs thereof to the seismic mass and to the stationary frame member. Further, in conjunction with the latter feature, I have designed the flexure member of minimum length in comparison to the springs and cantilevers of known motion sensing devices and accelerometers. By means particularly of these features I have succeeded in producing a minute but reliable instrument having a weight less than about 10 grams.

This has been conveniently accomplished, according to the invention, by boring a pair of holes in a block on opposite sides of the longitudinal axis of said block and intermediate the ends thereof, leaving a thin wall between the holes, and forming a slot between each of the holes and the adjacent outer walls of the block. Thus there is formed an integral flexure of small section between the end portions of the block, and by securing one end portion of the block against movement and permitting the opposite end portion to be free to oscillate, said opposite end portion acts as a seismic mass or armature which pivots about the weakened section or flexure formed by the thin wall between said holes.

This integral flexure and armature structure is symmetrical about a common longitudinal axis, and thus permits equal displacement of the seismic mass or armature in opposite directions on the imposition of equal forces in opposite directions. Thus, the structure of this application is not subject to mechanical hysteresis or lost motion, which is a disadvantage of prior art accelerometers employing spring connected to the armature and frame by screws or other fasteners. These prior art devices are generally asymmetric along a longitudinal axis through the spring and armature, and hence motion of the armature in opposite directions by a given force is unequal, resulting in such mechanical hysteresis.

Further, by mounting the movable mountings or pins for the strain wires near the end of the seismic mass or armature away from the flexure, instead of vertically over the flexure as in prior art accelerometers, I have magnified the effect of the axial movement of the armature. This increases the strain on the wires for any given displacement of the armature, thus increasing the accuracy and sensitivity of the instrument, and also facilitates overload stop setting to prevent strain on the wires beyond a predetermined maximum strain.

I have also provided means, specifically in the form of a pair of diaphragms positioned over cavities in the frame within the instrument housing, forming air chambers to provide for contraction and expansion of the damping oil incorporated in the instrument. This structural feature reduces the amount of oil required in the instrument, and also decreases the size of the case required.

In addition I have devised a means for decreasing the number of strain wire mounting pins, and thereby conserving additional weight and space, according to the invention, while employing the usual set of four strain wires constituting the four active arms of a bridge circuit. This is accomplished by mounting two of said wires on one common set of pins on one side of the armature, and the other two wires on another common set of pins on the other side of the armature.

The invention will be more clearly understood from the description below of a preferred embodiment taken in connection with the accompanying drawings wherein:

Fig. 1 is an exploded view of the components of an accelerometer according to my invention;

Fig. 4 is a vertical section taken on line 4—4 of Fig. 2;

Fig. 5 is a vertical section taken on line 5—5 of Fig. 3; and

Fig. 6 is a vertical section taken on line 6—6 of Fig. 2.

Figure 2:
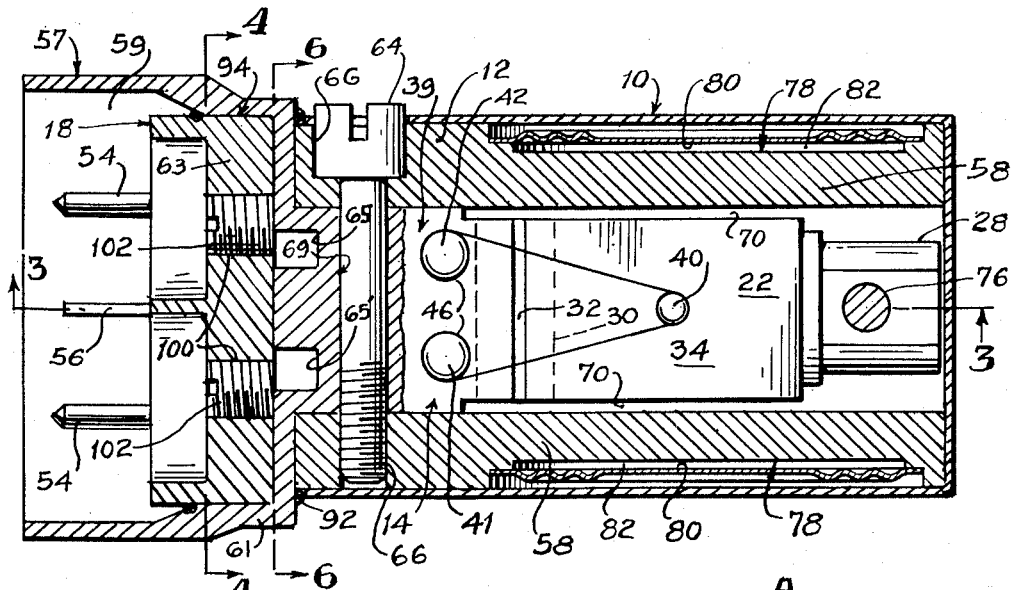
Fig. 2 is an irregular horizontal section of the assembled invention accelerometer of Fig. 1 taken on line 2—2 of Fig. 3.

Referring particularly to Fig. 1, it will be noted that the instrument shown in the drawings is composed of an outer case 10 which can be constructed of any suitable material, e.g., a metal such as "Monel" or plastic, a frame 12, preferably formed of a metal such as aluminum, a unit generally designated by numeral 14 and including an integrally formed armature, flexure, and stationary frame portion, with the strain wire transducer mounted thereon, and including an end closure, all of these components being more fully described hereinafter, and the terminal plate assembly, indicated by the numeral 18.

Turning now particularly to the group of components designated by numeral 14, numeral 20 represents an integral component consisting of the armature 22 constituting the major portion of said component, a fixed end portion 24, a thin wall section or neck 26 connecting armature 22 and end portion 24, and a cylindrically shaped lug 28 formed on the outer end of the armature. The thin wall section 26 is formed by boring two holes 30 of equal diameter through the block 20 on axes normal to the central longitudinal axis 31 of block 20 and of the armature 22, and on opposite sides of said longitudinal axis. The diameter of holes 30 is such that adjacent peripheries of said holes are sufficiently close together so as to form a thin wall of material 26 between the holes and along the longitudinal axis of block 20 and the armature, and a slot 32 is formed between the remote outer peripheral portions of each of holes 30 and the upper and lower faces 34 and 36 of the armature, said slots being disposed in alignment with each other on a common diameter of holes 30 normal to the longitudinal axis 31 of the block 20 and armature 22. While the above illustrates a convenient method of forming the thin wall section 26 between the armature 22 and fixed support member 24, it will be understood that such thin wall section can be formed in other ways.

Block 20 forming armature 22, fixed end portion 24 and the thin wall 26, is composed generally of a metal, e.g., beryllium copper. The armature 22 constitutes a seismic mass, and the thin connecting wall 26 functions as a flexure permitting the armature 22 to pivot substantially at the midpoint 38 of the short thin neck of metal 26 between holes 30. Hence, it will be seen that the spring or flexure 26 on which the armature 22 oscillates is thus markedly shortened and reduced in size over the cantilevers or springs generally employed in conventional accelerometers. Further, it will be observed that no fasteners or screws are required between the armature 22 and flexure 26, and between the fixed armature portion 24 which supports said flexure and the latter member, since flexure 26 is integral with armature 22 and the support member 24.

Mounted on the upper face 34 of armature 20 near the outer end thereof is an insulator pin 40 spaced some distance away from the flexure 26 along the axis 31 of the armature. On the upper face 39 of fixed support member 24 for the armature are positioned a pair of insulator pins 41 and 42 on opposite sides and equally spaced from the common axis 31 of both the armature and support member 24. Over pins 41 and 42 are placed in succession from the bottom up an insulating washer 43, a constantan ring 44, another insulating washer 45, and a constantan cap 46. An electrical resistance strain wire 48 is looped in tension from the constantan cap 46 on pin 41, about insulator 40 and then back to the constantan cap 46 on pin 42, the wire being spot welded to the constantan caps on pins 41 and 42. A second strain wire 50 is likewise looped in tension from the constantan ring 44 on pin 41, about insulator 40 and back to the constantan ring 44 on pin 42, wire 50 being spot welded to said constantan rings. Wires 48 and 50 are spaced from and parallel to each other, and to the axis 31 of the armature 22.

On the lower face 36 of armature 22 and in alignment with insulator 40 is an insulator pin 40', and on the lower face 52 of the fixed support member 24 are a pair of pins 41' and 42' in alignment with pins 41 and 42, the pins 40', 41' and 42' being constructed exactly like the respective pins 40, 41 and 42, and pins 41' and 42' also having placed thereon members 43 to 46 described above. Strain wires 48' and 50' are each looped in tension about pins 41', 40' and 42' in the same manner as noted above with respect to strain wires 48 and 50.

The ends of each of the four strain wires 48, 50, 48' and 50' are connected by leads (not shown) to a separate one of the four terminals 54 positioned on the terminal plate 18 at one end of the instrument. It will be noted that the wires 48, 50, 48' and 50' constitute the arms of a conventional Wheatstone bridge, the terminals 54 being electrically connected in conventional manner to a source of electrical potential and an indicator means such as a galvanometer. The two terminals 56 on the terminal plate are balancing terminals for connecting a balancing resistor in the bridge circuit, if desired.

It will be observed that the moving insulator pins 40 and 40' on the armature 22 are offset some distance from the flexure 26 along the armature, and are not mounted vertically over or directly below the flexure, as is done in prior art instruments of this type. This increases movement of these insulators on transverse movement of the armature, and magnifies changes in strain in the strain wires resulting from such movement.

Further, it will be observed that by winding the strain wires in pairs, each pair about three common pins on opposite faces of the movable armature 22 and stationary support member 24, a full bridge with four active legs is wound on a total of six insulator pins, the number normally required for a half active bridge and requiring a total of 12 such insulators in conventional devices.

Figure 3:
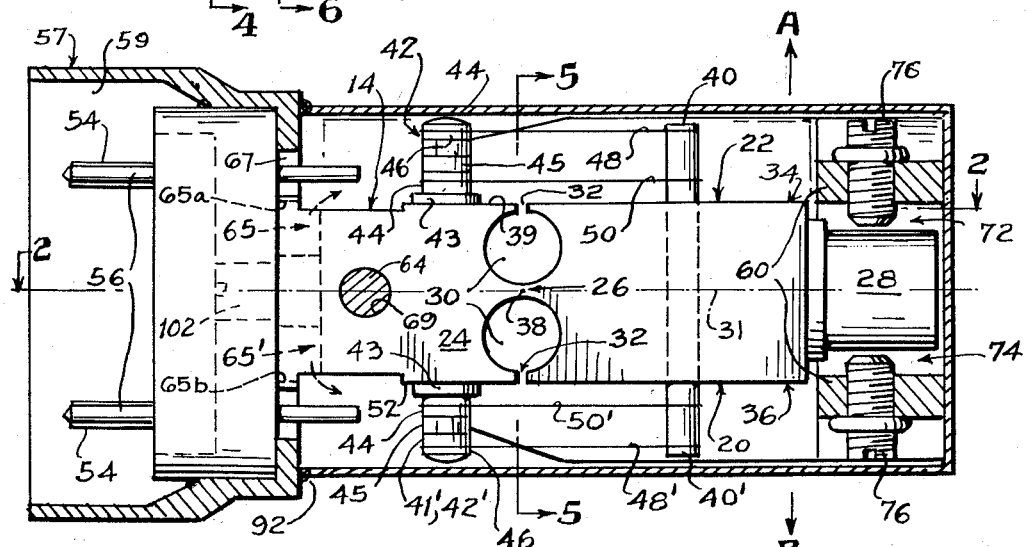
Fig. 3 is a vertical sectional view taken on line 3—3 of Fig. 2, certain parts being shown in elevation.

When the instrument is accelerated linearly in the direction indicated by arrow A in Figs. 1 and 3, it will be seen that armature 22 will pivot clockwise about the center 38 of flexure 26. This movement of the armature will cause strain wires 48 and 50 to be placed in tension and strain wires 48' and 50' to be relaxed. The result will be a change in relative resistances in the bridge circuit, producing an output which is proportional to the amount of displacement of the armature and hence to the magnitude of the acceleration causing such displacement. When the instrument is accelerated linearly in the opposite direction indicated by the arrow B in Figs. 1 and 3, the opposite effect takes place, that is, armature 22 pivots counterclockwise on the flexure 26, causing strain wires 48' and 50' to increase in tension while wires 48 and 50 are relaxed. This also produces an output from the bridge circuit proportional to the armature displacement and acceleration as described above, except in a direction opposite to that noted above.

It will be observed that the armature 22, flexure 26 and the fixed end portion 24 are all symmetrical about the common longitudinal axis 31. Thus, equal accelerations in opposite directions will produce equal displacements of the armature 22 in opposite directions with no lost motion or mechanical hysteresis resulting, as in prior art accelerometers.

Integrally formed at the outer end of the fixed armature portion 24 is an end closure 57 having an enlarged square flanged portion 59 and an inwardly extending smaller square flanged portion 61 integral with flange 59. At the inner end of flange 61 is a wall 63 in which are formed a pair of spaced slots 65 and 65', and apertures 67 for receiving the inner ends of terminals 54.

The unit represented by numeral 14 and including armature 22, lug 28, flexure 26, the fixed armature portion 24, the strain wire structure, and end closure 57, is supported in a frame 12, said frame being in the form of a yoke and composed of a pair of like side members 58, and a cross member 60 at one end of the frame, connecting said side members. The opposite end of the frame is open at 62 to receive the component 20 including members 22, 24, 26 and 28. A screw 64 passes through apertures 66 in a pair of arms 68 integral with each of the side members 58 of the frame adjacent the open end 62 thereof, and fastens the end portion 24 of unit 20 in fixed position between said arms 68, said screw passing entirely through an aperture 69 in the fixed armature portion 24. To prevent loosening of screw 64, a cement is preferably applied in apertures 66 and 69 prior to assembly of screw 64 therein. In this manner, the movable armature 22 is positioned between side members 58 of the frame 12, with a small clearance indicated at 70 in Fig. 2, between the sides of the armature 22 and the adjacent inner surfaces of sides 58, thus permitting the armature to oscillate freely in the direction of arrow A or B, viewing Figs. 1 and 3, between the sides 58 of the frame.

The cylindrical lug 28 at the outer end of the armature 22 is disposed in a central circular aperture 72 in the cross member 60 of frame 12. Sufficient clearance 74 is provided between the periphery of the lug and the inner peripheral surfaces of bore 72 to permit said lug to oscillate with the armature a limited distance. Stop screws 76 are provided in cross member 60 for adjustment of the maximum amount of oscillation permitted the armature 22, corresponding to the maximum strain to be imparted to the strain wires.

A shallow depression 78, see Figs. 1 and 2, is formed in the outer surfaces of each of the sides 58, and a diaphragm 80, e.g., of metal or plastic, is positioned over each of said depressions and fastened to the sides of the frame, e.g., by welding or equivalent means. Depressions 78 covered by diaphragms 80 thus form air chambers 82 for a purpose noted hereinafter.

The frame 12 including therewith the assembled armature unit 14 comprising members 22, 24 and 57, is inserted into the case 10 through an open end 84 thereof, and is held in position therein by placing the inner edge 86 of the flanged portion 61 of enclosure 57, in mating engagement with the outer periphery 88 of flanged portion 90 of case 10 adjacent the open end 84 thereof, and fastening said edge 86 to said outer flange periphery 88 by soldering as at 92. In this manner armature unit 14 is positioned within the case simultaneously with the attached frame 12, which is held in the case in a floating position simply by means of its attachment to unit 14 by means of the screw 64. That is, frame 12 in effect floats within case 10 substantially without touching the walls thereof, the frame, however, remaining fixed therein along with the fixed armature portion 24, while the armature 22 is free to oscillate between the frame side walls 58 on flexure 26, in the manner described above.

The terminal plate 18 which carries the four terminals 54 and the two balancing terminals 56 has an outer flanged portion 94 which fits into the inner flange 61 of the end closure 57, flange 94 being connected as by soldering to flange 61. In the terminal plate 18 are also a pair of damping oil filler screw holes 100 fitted with filler screws 102. One of the filler holes 100 communicates with a slot 65 in end closure 57, and the other filler hole communicates with the adjacent slot 65'. The slots 65 and 65' are offset, and the upper portion 65a of slot 65 and the lower portion 65b of slot 65' communicate with the spaces in the interior of case 10.

When the instrument is assembled in case 10, the interior of the case is filled with a damping liquid or oil through filler holes 100, and the screws 102 are then replaced. The liquid employed may be chosen from a wide variety of suitable liquids to give the desired damping effect. A particularly useful liquid is that provided by the synthetic silicone polymers. The liquids I employ have good insulating properties. The diaphragms 80 form captive air chambers 82 or air bubbles, which serve the dual purpose of providing for damping oil contraction and expansion due to temperature changes, and also reduce the total volume of oil required to fill the instrument. Further, this structure has the added advantage of reducing space, since the need for separate air chambers required for expansion and contraction of the oil in prior art devices is eliminated by my structure.

From the foregoing it is seen that I have designed a motion sensing device preferably in the form of an accelerometer having many features not possessed by prior art devices. Of particular significance, my device provides an improved accelerometer particularly adapted to miniaturization, by eliminating many of the conventional parts of present accelerometers of this general type and by redesigning of other parts such as the pivot member or flexure for the seismic mass, to thereby reduce substantially the overall size and weight of the instrument. The result is that I have been able to produce an accelerometer weighing as little as 5 grams or less, having valuable application in certain fields of instrumentation. All of this has been accomplished in the instant device without sacrificing accuracy, sensitivity and dependability.

While I have described a particular embodiment of my invention for the purpose of illustration, it should be understood that various modifications and adaptations thereof may be made within the spirit of the invention as set forth in the appended claims.

I claim:

1. A motion sensing device comprising a relatively fixed member and a relatively movable mass; a flexure means interconnecting said member and mass and supporting said mass for oscillatory angular movement about said flexure means relative to said member, the connection between said member and flexure means being on a first side of said flexure means and the connection between said mass and flexure means being on a second side of said flexure means, an electrical strain wire anchored to said member on said first side of said flexure means and to said mass on said second side of said flexure means and spaced from said flexure means, said strain wire extending across said flexure means, whereby said wire is stressed in accordance with said angular movements of said mass.

2. A motion sensing device as set forth in claim 1 wherein said relatively fixed member, said relatively movable mass, and said flexure means are formed as an integral structure.

3. A motion sensing device as set forth in claim 1 wherein said relatively fixed member and relatively movable mass comprise a block having a thin necked portion, said necked portion providing said flexure means.

4. A motion sensing device as set forth in claim 1 and further comprising a frame to which said relatively fixed member is secured.

5. A motion sensing device as set forth in claim 4 and further comprising a housing encasing said relatively movable mass, said flexure means and at least a portion of said frame, and a liquid filling said housing.

6. A motion sensing device as set forth in claim 5 wherein said frame is formed with a recessed chamber therein having a flexible diaphragm enclosing said chamber to accommodate expansions and contractions of said liquid due to temperature variations.

7. A motion sensing device comprising a relatively fixed member and a relatively movable mass, a flexure means connected at one end to said member and at its other end to said mass, said flexure means supporting said mass for oscillating angular movement about said flexure means relative to said member, a first pin connected to said fixed member, a second pin connected to said movable mass, the distance between said second pin and said flexure means being greater than the distance between said first pin and said flexure means, and an electrical strain wire connected to and supported by said pins, whereby said wire is stressed in accordance with said angular movement of said mass.

References Cited in the file of this patent

UNITED STATES PATENTS

| | | |
|---|---|---|
| 1,804,596 | Dickinson | May 12, 1931 |
| 2,453,549 | Statham | Nov. 9, 1948 |
| 2,487,793 | Esval et al. | Nov. 15, 1949 |
| 2,593,751 | Ruge | May 20, 1952 |
| 2,697,158 | Epstein et al. | Dec. 14, 1954 |
| 2,796,503 | Ward | June 18, 1957 |
| 2,803,134 | Ward | Aug. 20, 1957 |